United States Patent [19]
Smith et al.

[11] Patent Number: 5,423,248
[45] Date of Patent: Jun. 13, 1995

[54] AIR CIRCULATOR FOR IMPINGEMENT HEAT TRANSFER APPARATUS

[75] Inventors: Donald P. Smith, Dallas; Jarald E. High, Grand Prairie; Michael J. Dobie, Dallas, all of Tex.

[73] Assignee: Patentsmith Corporation, Dallas, Tex.

[21] Appl. No.: 187,113

[22] Filed: Jan. 26, 1994

Related U.S. Application Data

[60] Continuation of Ser. No. 904,916, Jun. 26, 1992, abandoned, which is a division of Ser. No. 701,583, May 15, 1991, Pat. No. 5,131,841, which is a continuation of Ser. No. 411,400, Sep. 22, 1989, abandoned.

[51] Int. Cl.$^6$ .............. A23L 3/00; A21B 1/00; F27B 9/04; F27B 9/28
[52] U.S. Cl. .................... 99/443 C; 99/476; 34/224; 34/229; 219/388; 219/400; 432/59; 432/145; 126/21 A; 126/39 D
[58] Field of Search ............ 99/339, 340, 357, 401, 99/447, 446, 450, 473–476, 483, 443 C; 219/400, 388; 126/21 A, 39 D; 432/59, 145, 152, 144, 176; 34/224, 229

[56] References Cited

U.S. PATENT DOCUMENTS

| | | |
|---|---|---|
| 3,098,260 | 7/1963 | Richeson . |
| 3,289,432 | 12/1966 | Brennan et al. . |
| 3,308,740 | 3/1967 | Henson et al. . |
| 3,369,375 | 2/1968 | Gerweck et al. . |
| 3,522,936 | 8/1970 | Geipel et al. . |
| 3,827,346 | 8/1974 | Tropp et al. ............... 99/446 |
| 3,884,213 | 5/1975 | Smith ..................... 126/21 A |
| 4,094,627 | 6/1978 | Milton, Jr. . |
| 4,116,620 | 9/1978 | Stibbe . |
| 4,154,861 | 5/1979 | Smith . |
| 4,338,911 | 7/1982 | Smith . |
| 4,377,109 | 3/1983 | Brown et al. . |
| 4,462,383 | 7/1984 | Henke et al. . |
| 4,474,498 | 10/1984 | Smith . |
| 4,479,776 | 10/1984 | Smith . |
| 4,481,396 | 11/1984 | Matsubayashi et al. ....... 219/400 X |
| 4,576,090 | 3/1986 | Burtea ................... 99/443 C |
| 4,591,336 | 5/1986 | Konczalski . |
| 4,626,661 | 12/1986 | Henke ............... 99/443 C X |
| 4,679,542 | 7/1987 | Smith et al. . |
| 4,701,340 | 10/1987 | Bratton et al. . |
| 4,753,215 | 6/1988 | Kaminski et al. . |
| 4,757,800 | 7/1988 | Shei et al. . |
| 4,831,238 | 5/1989 | Smith et al. .................. 219/400 |
| 4,834,063 | 5/1989 | Hwang et al. . |
| 4,881,519 | 11/1989 | Henke . |
| 4,965,435 | 10/1990 | Smith et al. .................. 219/388 |
| 5,025,775 | 6/1991 | Crisp .......................... 126/21 A |
| 5,131,841 | 7/1992 | Smith et al. . |
| 5,180,898 | 1/1993 | Alden et al. ................. 219/388 |

FOREIGN PATENT DOCUMENTS

| | | |
|---|---|---|
| 524652 | 9/1982 | Australia . |
| 0245618 | 11/1987 | European Pat. Off. . |
| WO89/00393 | 1/1989 | WIPO . |

*Primary Examiner*—Timothy F. Simone
*Attorney, Agent, or Firm*—Crutsinger & Booth

[57] ABSTRACT

A method and apparatus for heating a product which includes a plurality of tapered ducts in a cabinet above and below a conveyor to form streams which are directed toward the product. Spent air is drawn through return ducts which have intake openings centered between entrance and exit openings in the cabinet and centered between lateral edges of a conveyor and between the tapered ducts to provide a balanced flow of spent air in the cabinet to the return opening. Temperature controlled gas is delivered at an angle through an array of openings adjacent opposite edges of an opening through which a conveyor extends to cause most of the heated air to be drawn to the return duct opening and to maintain internal pressure in the cabinet to prevent ingress and egress of air through the opening.

9 Claims, 7 Drawing Sheets

AIR CIRCULATOR FOR IMPINGEMENT HEAT TRANSFER APPARATUS

This application is a continuation of application Ser. No. 07/904,916, filed Jun. 26, 1992, now abandoned which is a division of application Ser. No. 07/701,583, filed May 15, 1991, now U.S. Pat. No. 5,131,841, issued Jul. 21, 1992, which is a continuation of application Ser. No. 07/411,400, filed Sep. 22, 1989 (now abandoned).

TECHNICAL FIELD

The convection oven disclosed herein incorporates improved air circulating apparatus adapted to form air streams angled to exclude ambient air from entrance and exit openings into a cooking chamber, in combination with an air return duct having an air return passage configured to draw spent air to a central portion of the oven to balance air pressure across the openings.

BACKGROUND OF INVENTION

The oven disclosed herein relates to devices of the type disclosed in U.S. Pat. No. 4,154,861, entitled "Heat Treatment of Food Products"; U.S. Pat. No. 4,338,911, entitled "Cooking Apparatus"; U.S. Pat. No. 4,377,109, entitled "Apparatus for Baking Food Products Such as Pizzas"; U.S. Pat. No. 4,479,776, entitled "Thermal Treatment of Food Products"; U.S. Pat. No. 4,679,542 entitled "Fan-Plenum Configuration"; U.S. Pat. No. 4,462,383, entitled "Impingement Food Preparation Apparatus"; U.S. Pat. No. 4,474,498, entitled "Multiple-Pass Impingement Heating and Cooling Device"; and U.S. Pat. No. 4,757,800 entitled "Air Flow System for A Low Profile Impingement Oven."

Ovens of the type disclosed in Smith U.S. Pat. No. 4,679,542 have enjoyed substantial commercial success for food service applications and particularly in fast food operations such as cooking pizza and other food products in restaurants and food service establishments. Food products are rapidly heated by air streams which impinge against the surface of food products moved through the oven on a conveyor.

Convection ovens employ high volumes of rapidly moving air which in some configurations tend to draw cool outside air through entrance and exit openings through which a conveyor extends and to permit the escape of heated air through the conveyor openings. Circulation of air into and out of the oven wastes energy required for heating the rapidly circulating air and increases the warmup time required to place the oven into service. Further, the escaping hot air may cause discomfort of nearby persons.

The enhanced efficiency and rapid heating of food products in impingement ovens is dependent upon delivering defined air streams to impinge upon discrete areas of a moving food product. Blowers have been positioned either adjacent one side of the conveyorized oven or above or below the conveyor for circulating air. However, the suction toward the inlet of one side of the conveyor has caused air to be drawn into the sides of the inlet and exit openings nearest the blower and-exhausted through sides of the inlet and exit openings on the opposite side of the conveyor.

The conveyorized convection ovens described in the above identified patents use air ducts extending across the width of the conveyors to supply the air streams. Uniformity of the effective heat transfer across the width of the conveyor is very important for reproducible operation and uniform baking. Inspiration of outside air causes localized temperature differences; and, uneven intensity of an application across the width of the conveyor causes uneven baking.

SUMMARY OF INVENTION

The oven disclosed herein incorporates a blower for delivering air into air dispensing ducts and to draw air from a compartment having an entrance opening wherein the dispensing duct is provided with an array of openings for forming an array of air streams which are directed toward a food product. The air return duct is provided with a return opening positioned equal distances from edges of the entrance opening so air is pulled from near the center of the compartment rather than from the blower side of the compartment. Spent air travels generally transversely of the length of the air dispensing duct toward the central air return passage in the return duct. Thus, the tendency for air to be drawn through the entrance and exit openings in the end walls of the cabinet into the blower side of the oven and to escape through the opposite side of the entrance and exit openings in the end walls of the cabinet is significantly reduced.

Further, an array of inclined air streams impinge against splash surfaces or upon each other in the vicinity of entrance and exit openings through which the conveyor extends. Outside air, drawn toward and entrained by streams of the inclined array, is deflected away from the cooking area when the air stream divides as it splashes, while heated air circulating in the oven is deflected toward the interior of the oven.

Improved air dispensing ducts disclosed herein include the air directing means for dispensing streams of gas toward the upper and/or lower surfaces of a conveyor and toward impact surfaces of the oven or products entering or leaving the oven. In some embodiments, first and second arrays of air streams are advantageous. The first array of streams is angled or inclined relative to streams of the second array and the streams of the second array define a cooking area with maximum heating efficiency.

Improved air flow into the dispensing ducts and improved uniformity of baking is provided by a grid with multiple linear passages in the dispensing duct to form air streams which move longitudinally into the interior of the duct. A vane in the duct may be used to direct a portion of the streams of longitudinally moving air toward selected areas of the duct for balancing and substantially equalizing air flow from different areas of the dispensing duct. As air leaves the blower and turns into the dispensing ducts the rapidly moving air-concentrates toward the outside of the turning radius leaving a low pressure area inside the turning radius. This low pressure area causes extreme turbulence wasting air velocity and also causes the air to apply reduced pressure to the duct openings near the inlet to the duct. The reduced pressure in these openings causes less heat transfer and uneven baking across the width of the conveyor. A multiple opening directing means with linear passages eliminates most of the turbulence in the low pressure area and reduces the starving of the openings nearest the inlet of the duct, thus providing improved uniformity of baking.

DESCRIPTION OF DRAWINGS

Drawings of a preferred embodiment of the conveyorized oven are annexed hereto so that the invention may be better and more fully understood, in which.

Numeral references are employed to designate like parts throughout the various figures of the drawings.

DESCRIPTION OF A PREFERRED EMBODIMENT

Figure 1:
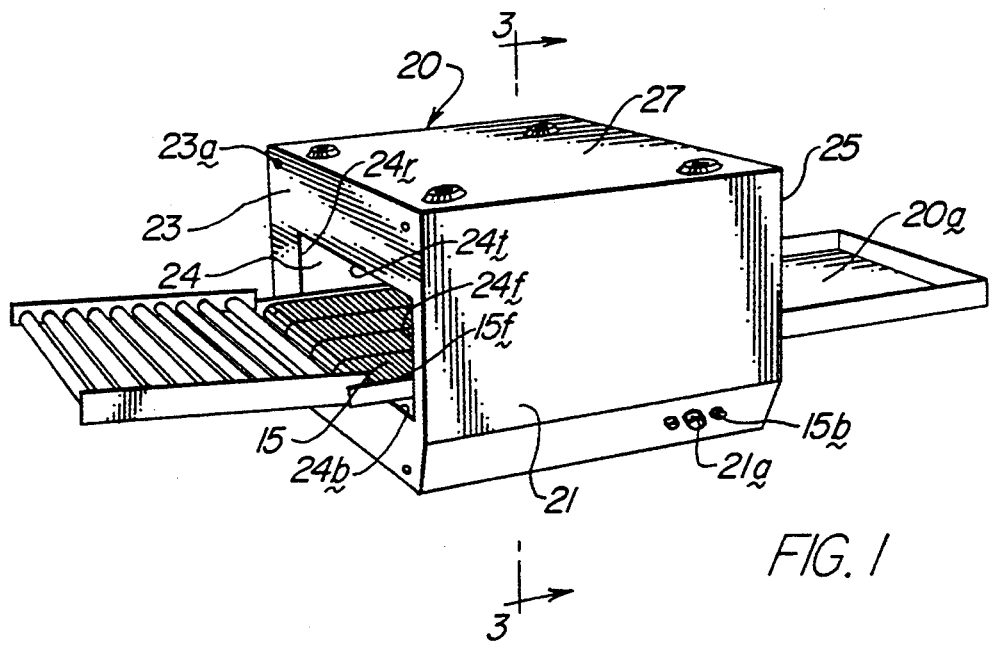
FIG. 1 is a perspective view illustrating the front and the entrance end of the conveyorized oven.
Figure 2:
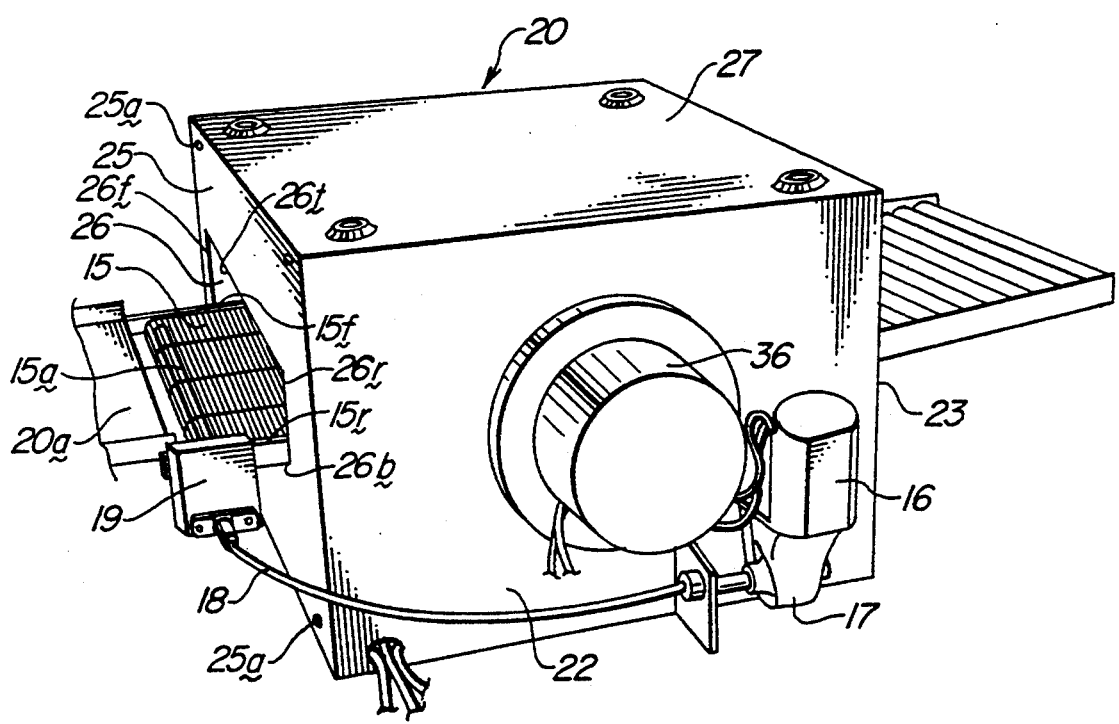
FIG. 2 is a perspective view illustrating the rear and the exit end thereof.

Referring to FIG. 1 of the drawing, the numeral 20 generally designates a cabinet for a conveyorized impingement oven. The cabinet comprises a front wall 21, rear wall 22 and spaced end walls 23 and 25. End wall 23 has an entrance opening 24 extending therethrough and end wall 25 has an exit opening 26 extending therethrough. Entrance opening 24 has top and bottom edges 24t and 24b and front and rear edges 24f and 24r. Exit opening 26 has a top wall 27 and bottom wall 28 extend between front wall 21 and rear wall 22 to form cabinet 20 through which a conveyor 15 extends.

Conveyor 15 to support the food product P preferably comprises a continuous loop wire mesh conveyor of conventional design movably supported by rollers 15a adjacent each end of cabinet 20. The conveyor 15 passes through inlet opening 24 formed in the end wall 25 such that the product P may be deposited on the upper portion of conveyor 15 adjacent end wall 25, moved through the oven, discharged through exit opening 26 and deposited on shelf 20a detachably secured by hooks (not shown) to the end of conveyor 15. A front edge 15f of conveyor 15 extends adjacent front edges 24f and 26f of entrance opening 24 and exit opening 26 while a rear edge 15r extends through openings 24 and 26 adjacent rear edges 24r and 26r.

Suitable means for driving the conveyor 15 comprises a variable speed electric motor 16 which is drivingly connected to one of the rollers 15a by a drive mechanism 19. Suitable speed control means such as a rheostat 15b is provided for controlling the speed of conveyor drive motor 16. The rheostat may be calibrated to indicate the number of minutes the food product is to remain in the oven depending upon the requirements for cooking a particular food product P.

Conveyor drive motor 16 is mounted on the rear wall 22 of cabinet 20 and is drivingly connected to a gear box 17 which drives a flexible drive cable 18 connected to a conveyor gear drive box 19. The roller 15a on the end of conveyor 15 is driven by gear box 19 thorough a quick disconnect drive coupling on the end of drive cable 18 to permit removal of conveyor 15 for cleaning.

Figure 3:
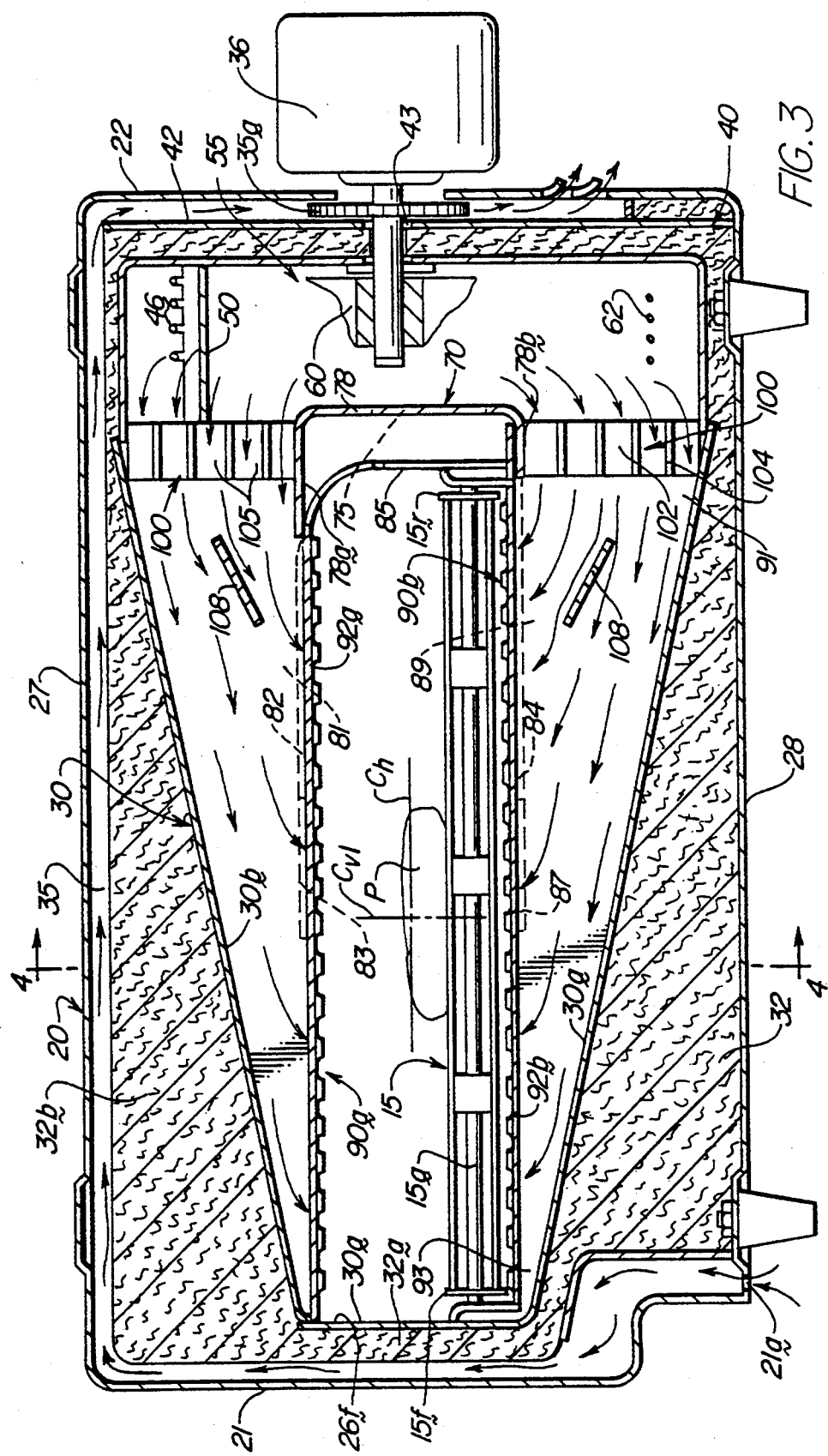
FIG. 3 is a cross sectional view taken substantially along line 3—3 of FIG. 1.

As best illustrated in FIGS. 1 and 3 of the drawing, front wall 21, top wall 27 and bottom wall 28 are formed by outer pieces of sheet metal forming a cavity in which a generally u-shaped lining member 30 is mounted to form the interior of the oven and to provide hollow space containing insulation 32 to prevent thermal conduction through walls of the oven.

As best illustrated in FIG. 3 of the drawing, the layer of insulation 32a in front wall 21 is thinner than the space between front wall 21 and front panel 30a of oven liner 30. Further, sheet 32b of insulation between top panel 30b of liner 30 and top wall 27 is thinner than the space therebetween forming an air passage 35 which extends through the front wall 21 and across the top wall 20 of cabinet 20. Vent openings 21a are formed adjacent the lower edge of front wall 21 permitting air to be drawn by a transverse flow fan 35a through air passage 35 as indicated in the arrows in FIG. 3 of the drawing to dissipate heat from the front wall 21 and top wall 27 of cabinet 20.

Conveyor speed control rheostat 15b and temperature control thermostat 21a are mounted in the front wall 21 and cooled by the air stream drawn through air passage 35.

End walls 23 and 25 of cabinet 20 are preferably detachably secured, as by screw fasteners 23a and 25a to entrance end surfaces 27i and 28i and exit end surfaces 27e and 28e of the top wall 27 and bottom wall 28 to permit removal of end walls 23 and 25, having entrance opening 24 and exit opening 26 formed therein, for cleaning the interior of the oven. A partition wall 40 extends between end walls 23 and 25 and is mounted adjacent rear wall 22 to form a plurality of plenums 40a, 40b, 40c, and 40d in cabinet 20, as illustrated in FIG. 5.

Figure 5:
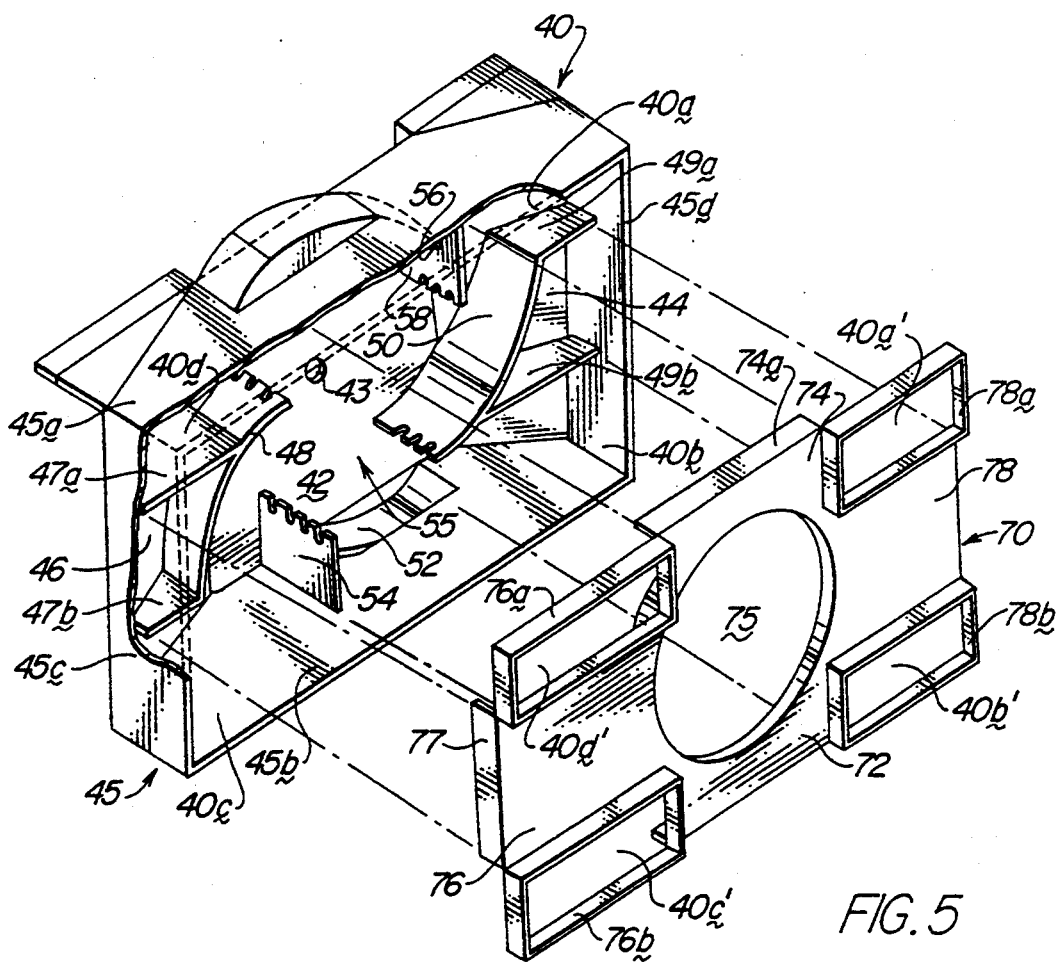
FIG. 5 is an exploded perspective view of a partition wall forming a plurality of plenums to which air dispensing ducts are connectable.
Figure 6:
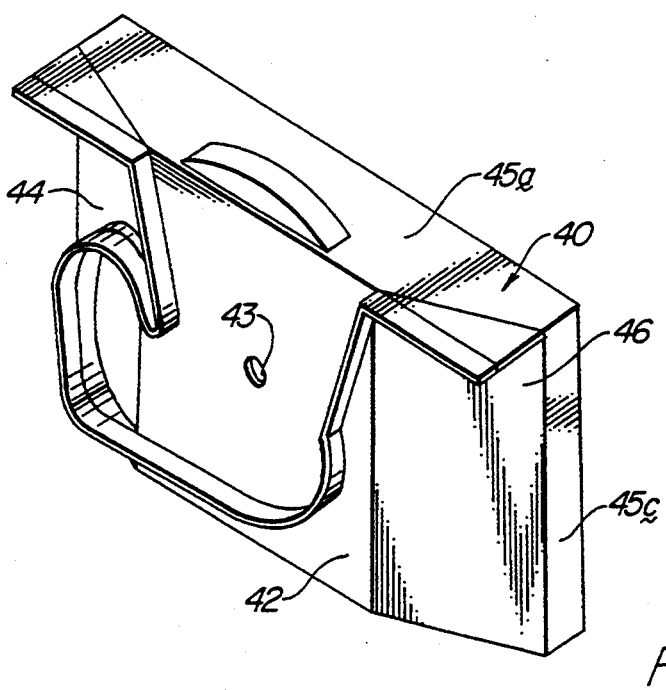
FIG. 6 is a perspective view of the rear of the partition wall illustrated in FIG. 5.

Referring to FIG. 5 of the drawing, partition wall 40 includes a generally flat central portion 42 having a central opening 43 through which a shaft for a fan motor 36 extends. Inclined walls 44 and 46 are secured adjacent opposite edges of central portion 42. A flange 45 comprising an upper leg 45a, a lower leg 45b and spaced vertically extending legs 45c and 45d, extends about the periphery of partition 40. Baffles 47a and 47b support a vane 48 which extends around a portion of the periphery of a blower 60 as will hereinafter be more fully explained. Baffles 49a and 49b support a vane 50. A lower vane 52 has one end welded or otherwise secured to leg 45b of flange 45 and has another end supported by baffle 54 welded or otherwise secured to leg 45b of flange 45. A vane 56 has one end welded or otherwise secured to leg 45a of flange 45 and has another end supported by a baffle 58 secured to flange 45a.

A heating element 62 in the form of an electrically energized coil is supported in notches formed in vanes 48 and 50 and baffles 54 and 58, as illustrated in FIGS. 3 and 5. The temperature may be adjusted by a thermostat 21a mounted on the front wall 21 of the cabinet which is controlled by the temperature sensor 21b located in plenum 40d.

As will be hereinafter more fully explained, the baffles and vanes on partition 40, in the illustrated embodiment, form a blower housing 55 having four separate plenums 40a, 40b, 40c and 40d spaced around its periphery through which air is dispensed by a fan 60 into air dispensing ducts 90.

Plenum outlet openings are formed by an x-shaped plenum wall member 70 having generally vertically extending legs 72 and 74, as illustrated in FIG. 5, and transversely extending legs 76 and 78 which extend outwardly from a central opening 75. Leg 76 has a projection 77 extending outwardly from the end thereof which extends between baffles 47a and 47b on partition wall 40 while leg 78 has a protection 79 which extends between baffles 49a and 49b on partition 40. Legs 72 and 74 have projections 72a and 74a which are positionable adjacent baffles 54 and 56 for securing plenum wall member 70 to flange 45 which extends about the periphery of partition wall 40.

As will be hereinafter more fully explained, hollow flanges 76a, 76b, 78a and 78b are formed on legs 76 and 78 and form entrance openings from plenums 40a, 40b, 40c and 40d into a pair of upper air dispensing ducts 90a and a pair of lower air dispensing ducts 90b.

Air drawn by fan 60 from the upper and lower return ducts through openings 75 and 75a is projected from blower housing 55 generally radially into corners of plenums 40a, 40b, 40c and 40d. The air flowing into each plenum is turned by inclined walls 44 and 46 toward the passages 40a', 40b', 40c', and 40d' bounded by flanges 78a, 78b, 76b and 76a into dispensing ducts 90a and 90b. Thus, the direction of flow of air from fan 60 is turned 90 degrees from a plane parallel to back wall 42 into ducts 90a and 90b extending transversely above and below conveyor 15. As will be hereinafter more fully explained, a grid 100 of elongated passages 105 is employed to balance air flow into ducts 90a and 90b to attain uniform air flow through openings 94, 96 and 97 across conveyor 15 into the cooking compartment.

To attain uniform cooking of products "P" spread across the width of conveyor 15, it is important that a uniform distribution of air pressure across the width of entrance opening 24 be maintained to prevent drawing ambient air through opening 24 on the blower side of the cabinet adjacent edge 24r and to prevent expelling heated air through opening 24 adjacent edge 24f. To achieve this, it is particularly important that the flow of spent air be returned such that there is no substantial differential in air pressure across the width of entrance opening 24 and exit opening 26 between front edges 24f and 26f and rear edges 24r and 26r.

As will be hereinafter more fully explained, upper and lower air return ducts 81 and 89 collect spent air from an area substantially equal distances from lateral edges 24f and 24r of entrance opening 24 and substantially aligned with upper and lower edges 24t and 24b. In the illustrated embodiment of FIGS. 3 and 4, upper and lower air return ducts 81 and 89 are substantially bisected by a central transversely extending vertical plane $C_{VT}$ and are positioned substantially equal distances above a central horizontal plane $C_H$ which extends parallel to conveyor 15 and through the center of entrance and exit openings 24 and 26.

Figure 4:
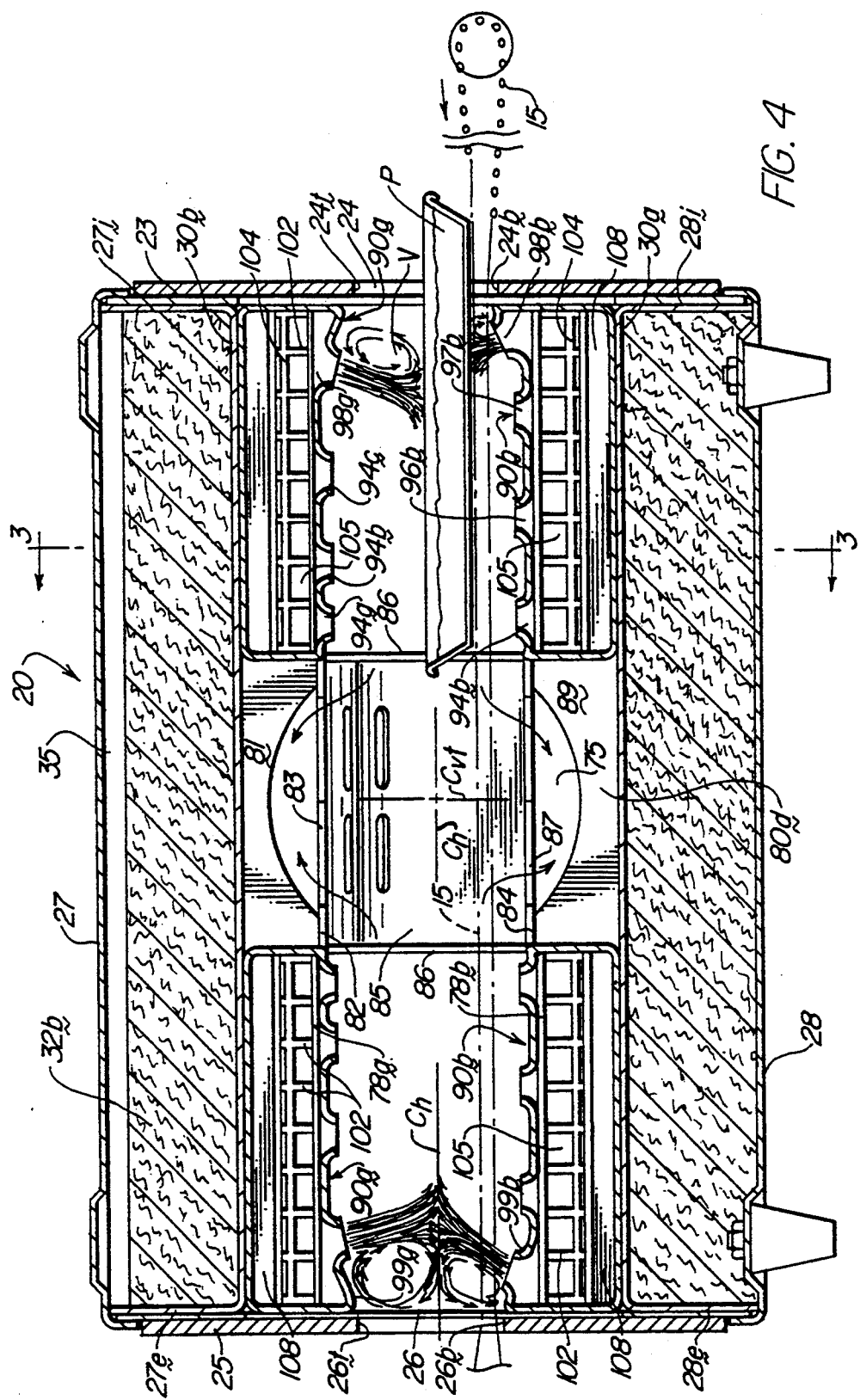
FIG. 4 is a cross sectional view taken substantially along line 4—4 of FIG. 3.

Plane $C_{VT}$ which extends transversely of the cooking compartment intersects plane $C_H$ along a line in FIG. 4 which is parallel to and space equal distances between vertical planes in which entrance opening 24 and exit opening 26 lie.

Planes $C_{VL}$ and $C_H$ intersect along a line in FIG. 3 which is spaced equal distances from front edges 24f and 26f and rear edges 24r and 26r.

Entrance opening 24 will preferably be formed to permit passage of a product P therethrough having preselected maximum dimensions. Return passages 82a and 83 into upper air return duct 81 are positioned near the upper surface of a product having the maximum preselected height and are substantially centered between lateral edges 24f and 24r.

The air stream 95 formed by an array of openings 98 is tilted at an angle "A" relative to a vertical plane to divert entrained outside air toward the outside of the cabinet and to direct heated air to the inside of the cabinet.

It should be apparent that stream 95 is composed of air from two sources. Temperature controlled air is projected from ducts 90a and 90b to form air streams 95. Since the static pressure of air stream is less than that of ambient air in entrance opening 24, a thin boundary layer of ambient air is entrained and travels with jet 95.

If a product P is not on conveyor 15 adjacent air streams 95, the streams will be projected through wire mesh conveyor 15 and impinge upon splash surfaces 99a and 99b on the opposing air dispensing duct 90a or 90b, in the configuration of the apparatus illustrated in FIG. 4 of the drawing. As the product P is carried by conveyor 15 between air streams 95, the surface of product P is engaged by the inclined air streams 95 causing the boundary layer of ambient air to be recirculated forming a vortex in the area immediately adjacent inlet opening 24, the recirculating vortex of ambient air tends to reduce heat loss through opening 24.

If a solid belt or band is employed for transporting produces through the oven, the surface of the belt or band will function as a splash surface for separating the entrained boundary layer of ambient air from the mass of temperature controlled air to minimize ingress and egress of air through opening 24.

It should be readily apparent that the provision of balanced air return through upper and lower air return ducts 91 relative to the entrance and exit openings 24 and 26 in combination with inclined air streams 95 which form a dynamic barrier or vortex of ambient air significantly reduces air flow through entrance and exit openings 24 and 26 for retaining heat in the oven and preventing uneven baking as a result of ambient air being drawn into openings in the cabinet nearest the blower and being discharged through ends of the openings on the opposite side of the cabinet.

Figure 8:
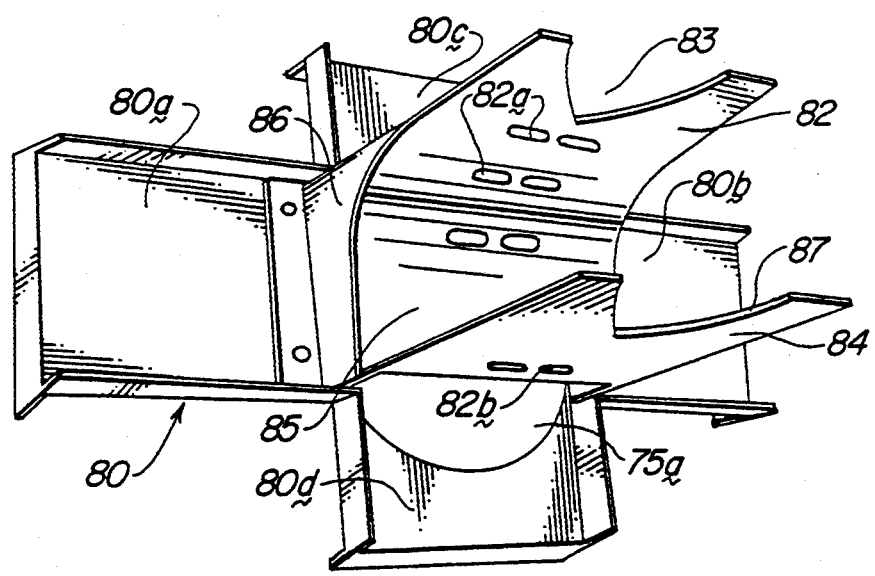
FIG. 8 is a perspective view of a member having shaped passages communicating with the air return duct.

Referring to FIG. 8 of the drawing, the numeral 80 generally designates an air return scoop comprising an upper cowling member 82 and a lower cowling member 84 deflected to form a transverse central partition 85 extending therebetween. Opposite edges of central portion 85 are deflected to provide generally vertically extending stand-off elements 86 to space partition 85 from the plane of the suction or intake opening 75 formed in plenum wall member 70.

Air scoop 80 is provided with four outwardly extending legs, legs 80a and 80b extending generally horizontally outwardly from standoff members 86 and legs 80c and 80d projecting substantially vertically therefrom.

Legs 80a–80d overlie legs 76, 74, 78 and 72 of x-shaped plenum wall member 70 when central portion 85 of air scoop 80 is positioned adjacent central opening 75 in wall member 70. Legs 80c and 80d have an opening 75a formed therein which is aligned with central opening 75 in plenum wall member 70 through which return air is drawn by fan 60.

Figure 7:
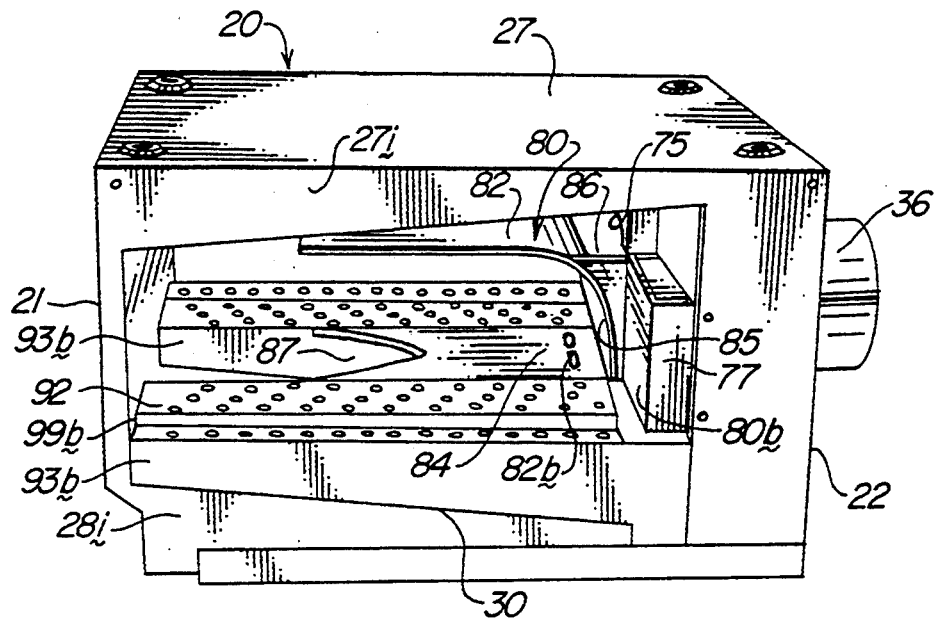
FIG. 7 is a perspective view of the discharge end of the oven, the conveyor and one of the upper dispensing ducts being removed to more clearly illustrate details of construction.

As illustrated in FIG. 8 of the drawing, cowling members 82 and 84 are provided with generally v-shaped openings 83 and 87, which as illustrated in FIG. 7 of the drawing, extend above and below a central portion of the conveyor 15 extending through the cooking compartment. Passages 82a are formed in cowling 82 and central portion 85 to draw controlled quantities of fluid through the wall of the air scoop 80.

Air return openings 82a, 83 and 87 are formed to balance the flow of spent air across the width of conveyor 15 between edges 15f and 15r to balance air pressure in cabinet 20 across the width of entrance opening 24 between edges 24f and 24r and across the width of exit opening 26 between edges 26f and 26r.

Figure 9:
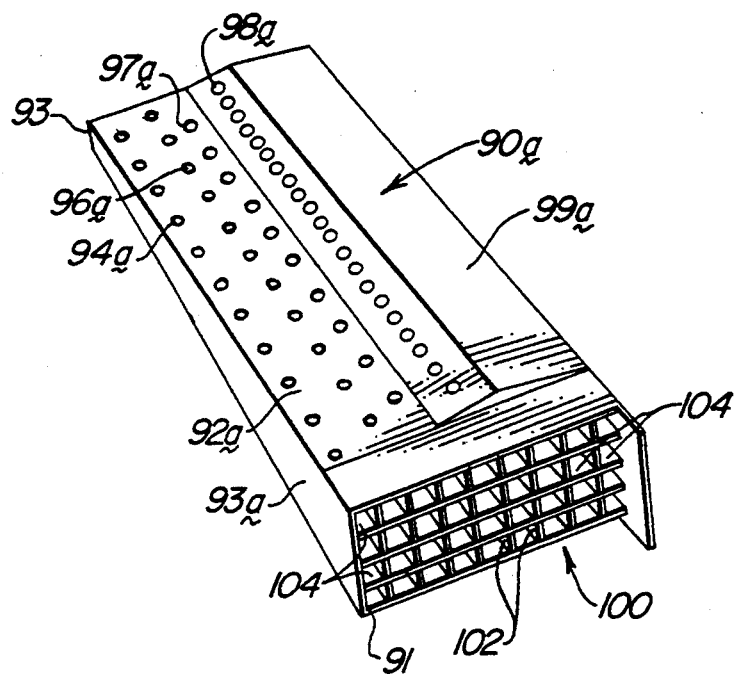
FIG. 9 is a perspective view of an upper air dispensing duct illustrating openings forming first and second arrays of air streams.
Figure 10:
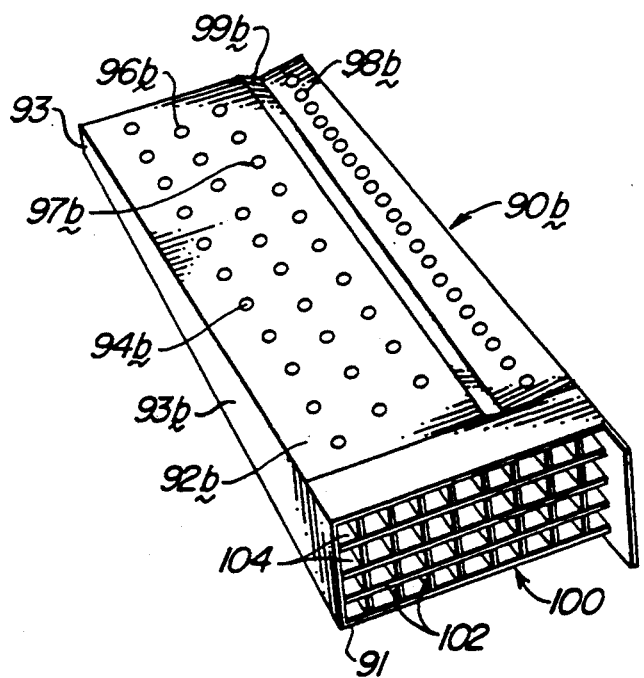
FIG. 10 is a perspective view of a lower air dispensing duct illustrating openings forming first and second arrays of air streams.

Referring to FIGS. 9 and 10 of the drawing, air dispensing ducts 90a and 90b comprise hollow tapered fingers of the general type disclosed in U.S. Pat. No. 4,338,911, the disclosure of which is incorporated herein by reference in its entirety for all purposes, having a perforated surface 92 in which stream forming openings are formed.

As best illustrated in FIG. 4 of the drawing, upper dispensing ducts 90a and lower dispensing ducts 90b are spaced above and below conveyor 15 and are arranged to direct streams of heated air toward the surface of the product P on the conveyor 15, as will be hereinafter more fully explained.

Ducts 90a and 90b preferably comprise channel-shaped body members having a web 92 extending between spaced flanges 93a and 93b which function as sidewalls of each duct.

As illustrated in FIGS. 3 and 9, the cross-sectional area of each duct 90 is greater adjacent its inner end 91 which communicates with the respective plenums 40a, 40b, 40c, and 40d and decreases along the length of the duct toward the outer end 93 adjacent front wall 21. The decreasing cross-sectional area allows for even pressure distribution of the heated air along the length of the cavity through each duct 90. It should be apparent that the major dimension of each duct 90a and 90b is the length thereof which is the distance between ends 91 and 93 of each duct.

Plates having a perforated surface 92 are secured across the open side of ducts 90a and 90b. A plurality of rows of perforations are formed in plate surface 92 and are arranged in the pattern as illustrated in FIGS. 9 and 10.

In the illustrated embodiment of FIG. 9, rows 94, 96 and 97 of passages form a first array of streams of temperature controlled gas which impinge against discrete areas on the surface of a food product while the row 98 of openings form a second array of air streams which recirculate any outside or ambient air drawn through the entrance and exit openings 24 and 26 back out of the cabinet.

As will be hereinafter more fully explained, each air duct 90 has a splash surface 99a or 99b formed thereon against which streams 95 of heated gas of the second array formed by passages 98a or 98b impinge for separating heated air flowing through the duct from outside air which may be drawn into the air stream 95.

As best illustrated in FIGS. 3 and 9 of the drawing, transversely extending inner-connected vertical partitions 102 and horizontal partitions 104 form a grid 100 of elongated passages 105, which project distinct generally parallel air streams, as indicated by arrows, which flow longitudinally into the interior of each air dispensing duct 90a and 90b.

It is important to note that although baffles and vanes have been employed heretofore, for example as disclosed in U.S. Pat. No. 4,757,800 in an effort to eliminate "cork-screw effect" of air delivered by axial fans, passages through the baffles have been relatively short compared to spacing between the baffles. Consequently, distinct parallel air streams were not formed as the air was moved through the passages between baffles. It is important that the length of each passage 105 be at least as long as the spacing between parallel surfaces of adjacent members 102 and adjacent members 104 to form streams which tend to flow substantially linearly into each duct 90a and 90b.

As illustrated in FIG. 3 of the drawing, a vane 108 is positioned to direct a portion of the parallel streams flowing through passages 105 in grid 100 toward the perforated surface 92 adjacent the inlet end 91 of duct 90 while permitting passage of a portion of the parallel streams toward the opposite end 93 of air dispensing duct 90 such that air flow through each opening 96 or 98 of each array of openings is substantially uniform longitudinally of each air dispensing duct 90.

From the foregoing it should be apparent that the improved air circulating apparatus is particularly adapted for an oven in which a product P is moved in a generally horizontal plane through entrance and exit openings 24 and 26 lying in generally vertical planes into a chamber wherein fluid is moved by a blower 60 in heat exchange relation with the product P in the chamber. Each air dispensing duct 90, having a perforated surface 92 adapted to form and deliver a plurality of streams of air, is supported adjacent a first edge of the entrance opening 24 and exit opening 26 such that air streams 95 are projected across the opening. Each stream 95 is inclined toward the interior of the chamber at an angle indicated by "A" in FIG. 11 in a range of 3° to 30° relative to the vertical plane of the opening 24 or 26 to form a stream of air across the opening. Splash surfaces 99a and 99b are formed adjacent an opposite edge of the opening. The air stream is inclined toward the interior of the oven so that most of the hot air returns to the interior of the oven and the entrained ambient air which has become part of the air stream is defected toward the outside of the oven. The splash surface may be opposing properly tilted air stream or a product passing through the oven opening.

Perforated surface 92 has a first array of openings in row 94, 96 and 97 having a primary function of transferring heat to the product P and a second array of openings in a row 98 configured to recirculate ambient outside air adjacent the entrance and exit openings. Openings 94, 96, 97 and 98 each array preferably comprising circular apertures, centers of said apertures being spaced apart a distance not exceeding four times the diameter of the apertures.

Air directing grid 100 in the air dispensing duct is adapted to form a plurality of generally parallel horizontally directed air streams in each air dispensing duct 90a and 90b as a volume of air is delivered through passages 105. Each of the passages 105 preferably has a length which is equal to or greater than the maximum dimension of any cross sectional area of the passage 105 and preferably at lease two times the maximum width or height of the cross-section of the passage 105.

Vane 108 mounted intermediate opposite ends 91 and 93 of each duct 90 is arranged to deflect a portion of the generally parallel air streams formed by air directing grid 100 toward openings 94, 96, 97 and 98 formed in the perforated plate 92.

Air return ducts 81 and 89 formed by air scoop 80, adjacent air dispensing ducts 90, have inlet openings 83 and 87 positioned intermediate opposite ends of air dispensing ducts 90 for returning air flowing through the perforated surface 92 of each duct. The return ducts preferably have generally V-shaped entrance openings 83 and 87, said entrance openings lying in a plane generally parallel to the plane of the conveyor 15. Blower 60, between the air return ducts 81 and 89 and the air dispensing ducts 90a and 90b, is adapted to draw air from a central portion of the chamber through the V-shaped openings 83 and 87 and to deliver air into the dispensing ducts 90a and 90b through plenums 40a, 40b, 40c and 40d. Heater element 62 is in heat exchange relation with air circulated by blower 60.

It should be appreciated that an improved method of controlling heat transfer to a surface of a product is performed by the apparatus hereinbefore described. A first array of a plurality of streams of high velocity gas is directed toward the surface of the product such that the streams of the first array of high velocity gas impinge against discrete areas on the surface of the product to wipe away a boundary layer of air and moisture from the discrete areas against which the streams of the first array impinge. The product P is moved by conveyor 15 relative to the streams of the first array such that heat is transferred, at areas upon which the streams of the first array impinge. A second array of streams of high velocity heated gas are directed at an angle "A" in a range of 3° to 30° relative to the generally vertical streams in the first array to prevent movement of spent air from the first array of streams from a confined area in the compartment.

The fact that spent gas from streams of the first array is contained in the confined area by streams of the second array such that the return of spent gas is balanced relative to the entrance and exit openings 24 and 26 and travels between streams of the first array to prevent diffusion of gas in streams of the first array prior to impingement against the surface of the product is an important feature of the improved method.

As hereinbefore described, the apparatus for heating a food product comprises a cabinet 21 having spaced walls, one of the walls 23 having an entrance opening 24 and a second of the walls 25 having an exit opening 26. Conveyor 15 extends through the chamber in cabinet 20 for delivering products from the entrance opening 23 to the exit opening 26. Air dispensing ducts 90 are mounted above and below conveyor 15 adjacent entrance opening 23 and exit opening 26. Air dispensing ducts 90 are adapted to direct streams of air toward a product on conveyor 15 and air return ducts 81 and 89 above and below conveyor 15 are provided with air return openings 83 and 87 above and below conveyor 15. Openings 83 and 89 lie intermediate opposite edges 15f and 15r of conveyor 15 for drawing air from air dispensing ducts 90 toward a central portion of cabinet 20 from areas above and below the conveyor 15.

Directing streams of the second array to impinge against inclined splash surface 99 when a product P is not present on conveyor 15 causes outside air to be deflected away from the defined area while gas forming the streams of the second array is deflected into the defined area to significantly reduce the warm-up time of the oven.

Second Embodiment

Figure 11:
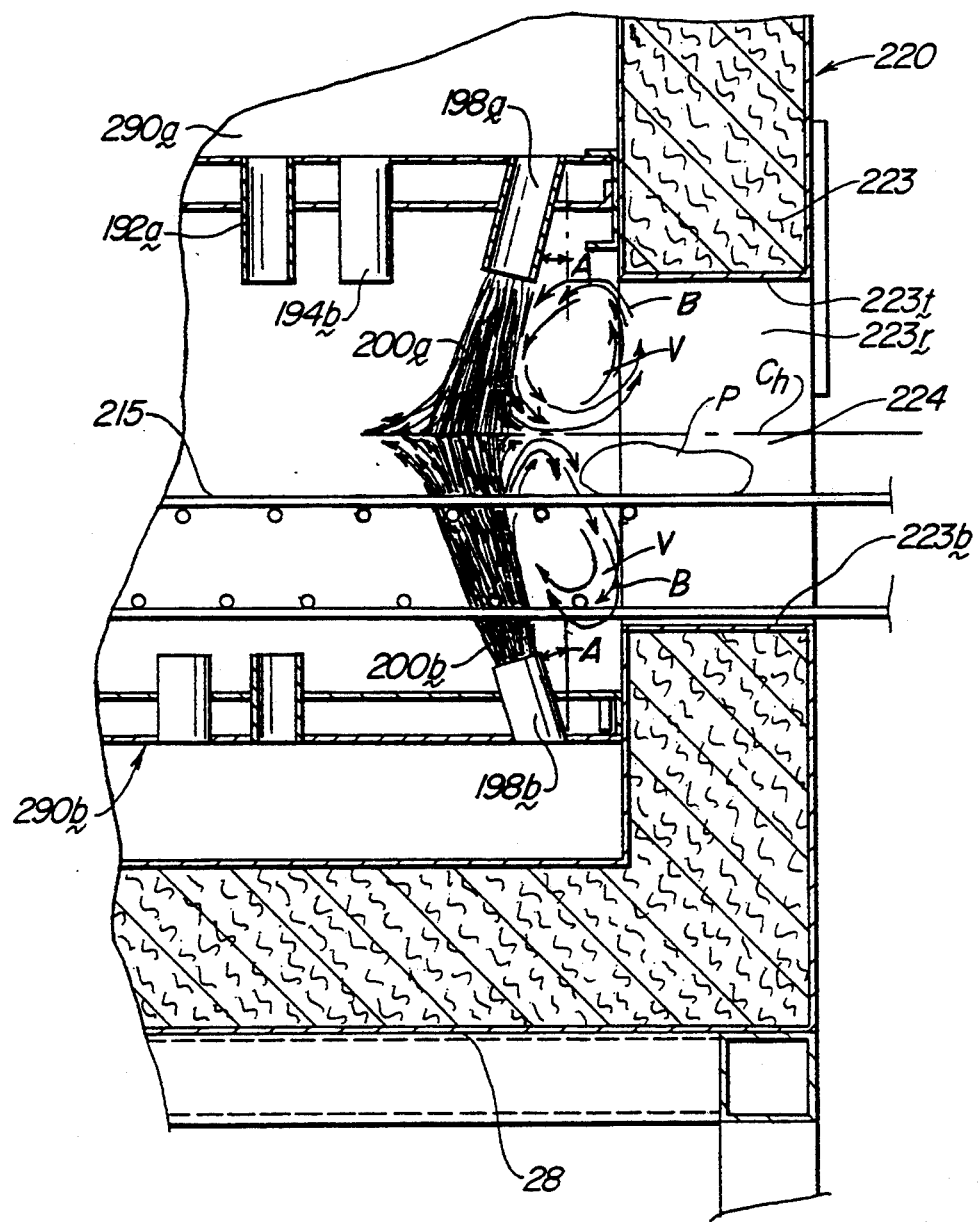
FIG. 11 is a cross sectional view similar to FIG. 3 of a modified form of the oven.
Figure 12:
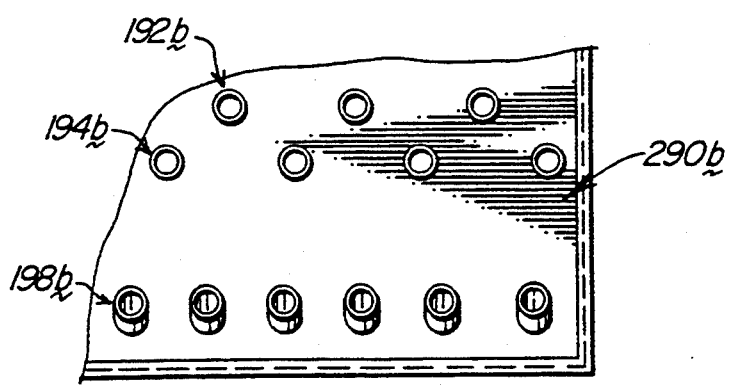
FIG. 12 is a plan view of the perforated surface of dispensing ducts of the oven illustrated in FIG. 11.

A modified form of the invention is illustrated in FIGS. 11 and 12 of the drawing. The numeral 220 generally designates the second embodiment of the oven having a conveyor 215 extending through an entrance opening 224 formed in end wall 223. Conveyor 215 is preferably an open conveyor formed by intersecting wires or strands welded or otherwise secured together to form an open mesh surface through air streams 200a and 200b are allowed to pass. The air streams are formed by elongated upper tubes 192a and 192b which form a first array of air streams and tubes 198a which form a second array of air streams 200a which are projected from the upper air dispensing duct 290a. The lower air dispensing duct 290b is similarly constructed and includes a row of tubes 198b inclined at an angle "A" in a range between 3° and 30° relative to the vertical plane, as indicated in FIG. 11, such that air streams 200a and 200b are projected toward a product P carried by conveyor 215 through the oven.

A pair of splash plates 230a and 230b are mounted between the upper and lower flights of the open mesh conveyor 215, each of the splash plates having a generally triangular shaped outer end 232 slidably supported in support elements 234 for adjustment longitudinally of the oven relative to air streams 200a and 200b. The upper splash plate 230a is preferably positioned such that the outer edge of air stream 200a impinges against the apex of shaped surface 232 for causing the very thin outer layer of air of jet 200a to be directed to the right as viewed in FIG. 11 of the drawing while the remainder of the air stream 200a is directed to the left as viewed in FIG. 11. Air drawn through entrance opening 224 by the rapidly moving air stream 200a will be entrained in the outer layer of air which is separated by shaped surface 232 and redirected outwardly to cause a vortex or whirlpool of swirling air indicated by the arrows "V" to be repeatedly drawn to air stream 200, entrained in the rapidly moving air and then separated from the mass of the air stream by the shaped surface 232. This vortex of recirculating air "V" forms a dynamic barrier which substantially prevents ingress or egress of air through entrance opening 224.

The temperature and humidity of the recirculating air in the oven are preferably controlled to provide optimum performance. The vortex "V" formed adjacent the entrance and exit openings enhances the control of temperature and humidity of the recirculating air in the oven.

The enclosed chamber, formed in the oven through which controlled temperature and/or humidity of the rapidly circulating gas, is isolated from outside air adjacent entrance opening 224 by the dynamic barrier "B." The recirculated heated air is directed inwardly at an angle "A" so that the interior atmosphere is returned to the inside and the outside atmosphere which has been entrained by streams 220a and 220b is cast to the outside.

As illustrated in FIG. 12 of the drawing, tubes 192b and 194b are arranged to form multiple rows of streams of air forming a first array of streams while tubes 198b are arranged in a row adjacent inlet opening 224 to form a second array of openings through which the rapidly moving air is delivered. If it is deemed expedient to do so, tubes 198b may be replaced by a single slot inclined at an angle "A" relative to a vertical plane for forming a substantially continuous air stream which extends across the direction of travel of the conveyor 215.

While the apparatus hereinbefore disclosed has been described as an oven equipped with heating elements for delivering heated air through the cooking compartment, it should be readily apparent that the heating elements may be replace with cooling elements for circulating cold air for cooling or freezing products. In either event the heat transfer rate between the air streams and the product "P" is significantly increased by the rapidly moving streams which impinge against discrete areas on the surface of the product. It is important that the openings 83 and 87 into the air return ducts 81 and 89 be positioned to draw air from an area substantially aligned with the center of opening into the compartment to minimize the disruption of air streams delivered from the upper and lower air dispensing ducts in route to the air return duct and to balance air pressure in the cabinet across the width of openings 24 and 26.

From the foregoing it should be readily apparent that other and further embodiments of the invention may be devised without departing from the basic concept thereof. For example, perforated plates 92a and 92b may be replaced with elongated tubes 192 for forming air streams as hereinbefore described. Slots or other air dispensing openings may be formed in plate 92 if it is deemed expedient to do so. Further, the spaced air dispensing ducts 90a and 90b may be replaced with a plate 92 inclined at an angle relative to a horizontal plane such that all of the air streams of the first and second array of streams are inclined at an angle "A" relative to a vertical plane such that streams of the first and second arrays of streams are substantially parallel.

Having described the invention, it is claimed:

1. Air circulating apparatus to heat or cool food products comprising: an air dispensing duct having an interior chamber and an inlet opening and a discharge opening, said inlet opening and said outlet opening communicating with an interior chamber in said air dispensing duct; air directing means adapted to form a plurality of parallel air streams in said chamber; and dispensing means on said duct, said discharge opening being formed in said dispensing means, said air directing means being adapted to balance air flow longitudinally of said dispensing means such that air flows substantially uniformly from said discharge opening.

2. Apparatus to heat or cool food products comprising: a cabinet; a product support having edges in said cabinet; a blower having a blower suction passage and a blower discharge passage; an air dispensing duct communicating with said blower discharge passage, said air dispensing duct forming a plurality of streams of air and directing said streams toward said product support; an air return duct communicating with said blower suction passage, said air return duct having a return passage positioned to draw air from said plurality of streams of air toward a central portion of said product support between edges of said product support.

3. Apparatus to heat or cool food products according to claim 2, said return passage being positioned substantially midway between edges of said product support.

4. Air circulating apparatus to heat or cool food products comprising: an air dispensing duct having an interior chamber, an inlet opening and a discharge opening, said inlet opening and said discharge opening communicating with said interior chamber; a jet plate having a plurality of spaced discharge openings; and a grid in said air dispensing duct having a plurality of passages extending therethrough, each of said passage having a length, width and height, said length being greater than the width and height such that parallel streams are formed in a volume of air flowing through said grid to form a plurality of parallel air streams in said interior chamber in said air dispensing duct and to balance air flow longitudinally of said jet plate such that air flows substantially uniformly from said spaced discharged openings.

5. Apparatus to heat or cool food products comprising: a cabinet; a product support having edges in said cabinet; a blower having a blower suction passage and a blower discharge passage; and air dispensing duct communicating with said blower discharge passage; a grid in said air dispensing duct, said grid having a plurality of passages extending therethrough, the largest circle which can be inscribed in said cross-sectional area such that parallel streams of air are formed in a volume of air flowing through said grid in said air dispensing duct, said air dispensing duct forming a plurality of streams of air and directing said streams toward said product support; an air return duct communicating with said blower suction passage, said air return duct having a return passage positioned to draw air from said plurality of streams of air toward a central portion of said product support between edges of said product support.

6. Apparatus to heat or cool food products comprising: a cabinet; spaced side and end walls on said cabinet, one of said end walls having an entrance opening and a second of said end walls having an exit opening, said side walls extending between said end walls; conveyor means having edges extending through said entrance and exit openings; blower means having a suction passage and a discharge passage; air dispensing means communicating with said discharge passage, said dispensing means forming a plurality of streams of air and directing said streams toward said conveyor means; air return means communicating with said suction passage; and cowling means on said air return means, said cowling means being configured to form an air return duct communicating with said suction passage of said blower means, said cowling means extending transversely of said conveyor means and forming a return passage adjacent said dispensing means and positioned such that air from said air streams is drawn toward a portion of said cabinet substantially midway between edges of said conveyor means.

7. Air circulating apparatus to heat or cool food products comprising: an air dispensing duct having an interior chamber, an entrance end and an inlet opening, said inlet opening communicating with said interior chamber in said air dispensing duct; said interior chamber in said air dispensing duct decreasing in cross-section longitudinally of said air dispensing duct, the largest cross-section of said interior chamber being adjacent said entrance end of said dispensing duct and the cross-section of said interior chamber decreasing longitudinally of said air dispensing duct; air dispensing means communicating means with said interior chamber and having a discharge opening; and air directing means for forming a plurality of parallel air streams in said interior chamber to balance air flow longitudinally of said air dispensing means such that air flows substantially uniformly from said discharge opening.

8. Apparatus to heat or cool food products comprising: a cabinet; a product support having edges in said cabinet; spaced side and end walls on said cabinet, one of said end walls having an entrance opening and a second of said end walls having an exit opening, said side walls extending between said end walls, said product support being positioned between said entrance opening and said exit opening; a blower having a blower suction passage and a blower discharge passage; an air dispensing duct communicating with said blower discharge passage, said air dispensing duct forming a plurality of streams of air and directing said streams toward said product support; and an air return duct communicating with said blower suction passage, said air return duct having a return passage positioned to draw air from said plurality of streams of air toward a central portion of said product support between edges of said product support.

9. Apparatus to heat or cool food products comprising: a cabinet; a product support having edges in said cabinet; a blower having a blower suction passage and a blower discharge passage; an air dispensing duct communicating with said blower discharge passage, said air dispensing duct forming a plurality of streams of air and directing said streams toward said product support; an air return duct communicating with said blower suction passage, said air return duct having a return passage positioned to draw air from said plurality of streams of air toward a central portion of said product support between edges of said product support; and means in said air dispensing duct forming a grid of passages, said passages having a length greater than the width of each passage to project generally parallel streams of gas into said air dispensing duct.

* * * * *

UNITED STATES PATENT AND TRADEMARK OFFICE
CERTIFICATE OF CORRECTION

PATENT NO.  : 5,423,248
DATED       : June 13, 1995
INVENTOR(S) : Donald P. Smith, Jarald D. High & Michael J. Doble It is certified that error appears in the above-indentified patent and that said Letters Patent is hereby corrected as shown below:

Column 4, line 28, change "wall 20" to read --wall 27--.

Column 9, line 2, change "lease" to read --least--.

Column 9, line 51, change "cabinet 21" to read --cabinet 20--.

Column 11, line 11, change "replace" to read --replaced--.

UNITED STATES PATENT AND TRADEMARK OFFICE
CERTIFICATE OF CORRECTION

PATENT NO. : 5,423,248
DATED : June 13, 1995
INVENTOR(S) : Donald P. Smith, Jarald D. High & Michael J. Dobie It is certified that error appears in the above-indentified patent and that said Letters Patent is hereby corrected as shown below:

Column 11, line 39 through line 50, please delete Claim 1 and in lieu thereof insert the following:

--1. Air circulating apparatus to heat or cool food products comprising: an air dispensing duct having an interior chamber and an inlet opening, said inlet opening communicating with said interior chamber in said air dispensing duct; air dispensing means communicating with said interior chamber and having a discharge opening; and an air directing grid in said inlet opening for forming a plurality of parallel air streams in said interior chamber in said air dispensing duct to balance air flow longitudinally of said dispensing means such that air flows substantially uniformly from said discharge opening. --

In Claim 5, Column 12, line 17, delete "and" and insert --an--.

In Claim 5, Column 12, line 20, after "therethrough," insert --each passage having a cross-sectional area and a length which is greater than the diameter of--.

In Claim 7, Column 12, line 63, delete "means" before "with said interior chamber."

Signed and Sealed this

Sixteenth Day of April, 1996

Attest:

BRUCE LEHMAN

*Attesting Officer*     *Commissioner of Patents and Trademarks*